F. J. RIBBLE.
HEEL CUTTING APPARATUS.
APPLICATION FILED MAY 7, 1917.
1,243,627.
Patented Oct. 16, 1917.
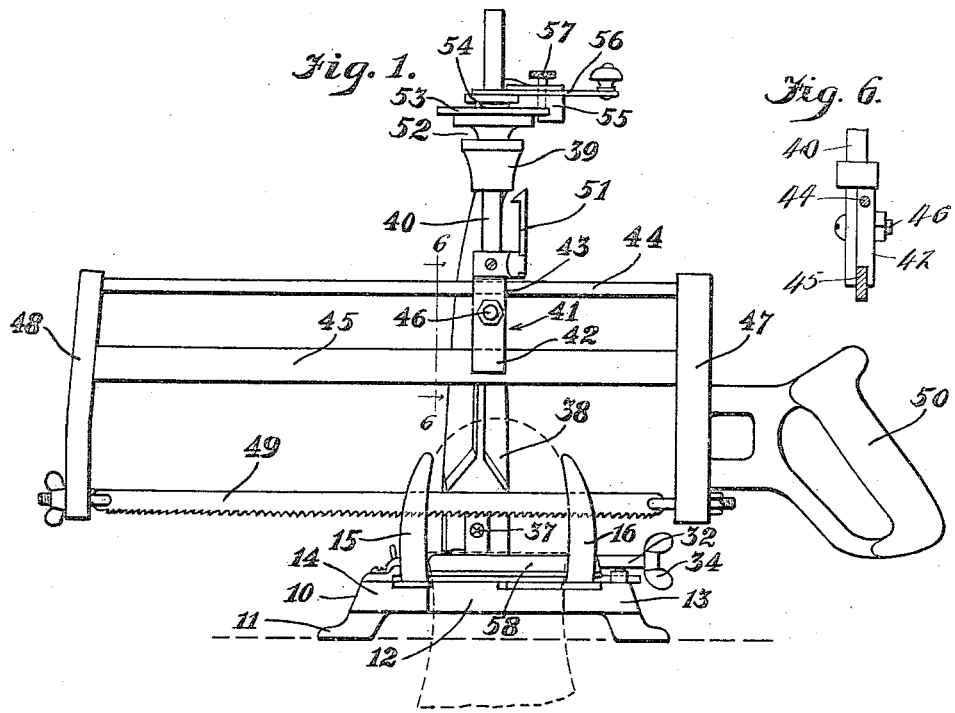
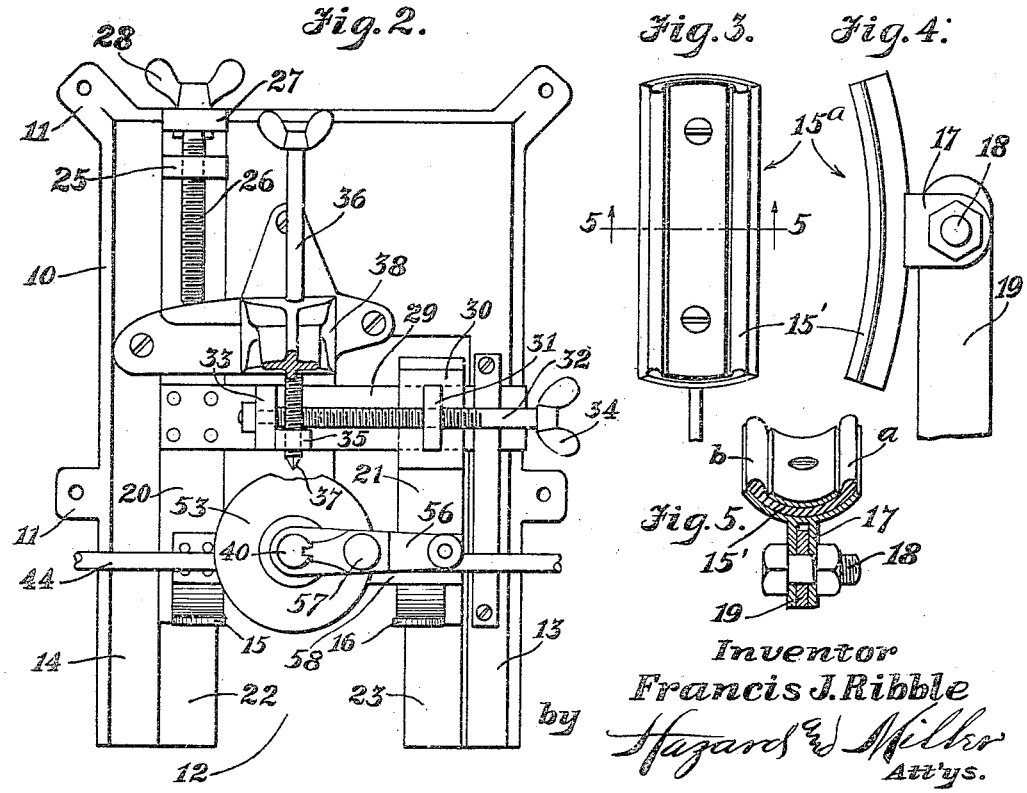
Inventor
Francis J. Ribble
by
Hazard & Miller
Att'ys.

UNITED STATES PATENT OFFICE.

FRANCIS J. RIBBLE, OF SAN PEDRO, CALIFORNIA.

HEEL-CUTTING APPARATUS.

1,243,627.

Specification of Letters Patent.

Patented Oct. 16, 1917.

Application filed May 7, 1917. Serial No. 167,083.

*To all whom it may concern:*

Be it known that I, FRANCIS J. RIBBLE, a citizen of the United States, residing at San Pedro, in the county of Los Angeles and State of California, have invented new and useful Improvements in Heel-Cutting Apparatus, of which the following is a specification.

This invention relates to a cutting member and particularly pertains to a heel cutting machine.

It is the principal object of this invention to provide a device for sawing off the heels of worn shoes so that new lifts may be applied thereto.

Another object of this invention is to provide adjustable means for guiding the blade of the saw so that it will make a cut at any desired angle to the upper portion of the shoe.

Another object of this invention is to provide a heel cutting apparatus which is entirely assembled and may be easily and manually operated without danger of cutting the shoe at a point other than the desired position.

Another object of this invention is to provide positive means for clamping the shoe in a position to cut the heel and holding the cut-away portion so that the leather will not be broken and torn at the completion of the cut, but will be cleanly severed.

Another object of this invention is to provide simple means for adjusting the clamping mechanism so that any desired amount of heel may be removed.

It is a further object of this invention to provide means for supporting the saw when not being used and permitting it to be readily brought into action.

Other objects will appear hereinafter.

The invention is illustrated, by way of example, in the accompanying drawings in which:

Figure 1 is a view in front elevation illustrating the entire machine and particularly disclosing the saw supporting means.

Fig. 2 is a view in plan disclosing the final elements of the apparatus and further showing parts broken away to more clearly set forth the adjustable features of the device.

Fig. 3 is a view in elevation of one of the shoe clamping members, which might be used in place of the one shown in Fig. 1.

Fig. 4 is a view in side elevation of the members shown in Fig. 3.

Fig. 5 is a view in section and elevation illustrating the detail construction of the clamping member as seen on the line 5—5 of Fig. 3.

Figs. 3, 4 and 5 show a modification of the clamping jaws shown in Figs. 1 and 2.

Fig. 6 is a cross-sectional detail on the line 6—6 of Fig. 1, and showing the oscillating mounting of the saw frame.

Referring more particularly to the drawings, 10 indicates a base which is here shown as rectangular in shape and fitted with lugs 11 by which it may be fastened to a bench. The base is formed with a long rectangular open ended slot 12 within which the shoe is positioned when it is desired to remove a portion of its heel. Due to the formation of this slot, a pair of outwardly extending supporting arms 13 and 14 are formed which over-hang the edge of the bench and form guide-ways for the shoe clamping mechanism. This mechanism, as shown in Figs. 1 and 2, includes a pair of plain jaws 15 and 16; or a pair of the built-up jaws 15ª formed as particularly shown in Figs. 3-5, inclusive, of the drawings. The plain jaws 15 and 16 have inner faces slightly curved in elevation to fit the sides of the heel and said jaws are rigidly secured to slide-plates 20 and 21. The built-up jaws 15ª are of arcuate formation longitudinally, as well as arcuate in section, so that they will conform to the curved face of the heel portion of the shoe upper. The jaws are faced with rubber strips 15′ which prevent them from damaging the shoes. Lugs 17 are formed upon the back of each of the jaws and are pivotally mounted by means of bolts 18 to vertical standards 19. The standards 19 are secured to the slide-plates 20 and 21, which lie upon guide-ways 22 and 23 formed along the upper face of the extensions 13 and 14 of the base. The slide-plate 20 extends substantially the length of the base and is formed with a vertically extending lug 25 which is threaded to receive an adjusting screw 26. This screw is fixed to rotate within a lug 27 formed upon the face of the base plate. The screw is adapted to be rotated by a wing-nut 28. It will be evident that rotation of the screw will cause the slide-plate 20 to be moved back and forth along the top of the base. The plate is also connected by means of a cross-bar 29 to the plate 21. Due to this connection the slide-plates 20 and 21 will be simultaneously reciprocated by the screw 26 and the jaws 15 and 16 horizontally adjusted in relation to the base plate.

The slide-plate 21 is fitted with a guide-block 30 through which the rectangular end of the connecting bar 29 extends and by which the bar is slidably mounted in relation to the plate. A lug 31 is positioned upon the block 30 and formed with a threaded aperture to receive a transverse adjusting screw 32. This screw terminates within a lug 33 formed upon the connecting bar 29 and causes the slide-plate 21 to be moved toward and away from the slide-plate 20 as the screw 32 is manipulated by its wing-nut 34.

Mounted upon the connecting bar 29 is an upright 35 which has a threaded opening through which a clamping screw 36 extends. This screw is formed with a sharpened end 37 which may be brought to bear against the face of the shoe heel being cut and thus prevents the heel from being torn during the cutting operation.

Fixed upon the base and extending upwardly therefrom is a vertical supporting bracket 38. This bracket extends upwardly and is brought forward to substantially hang with its terminating upper end over the longitudinal center of the base and at approximately the edge of the cut-away portion 12 between the extensions 13 and 14. This upright is formed with a bearing 39 within which a guide-shaft 40 is slidably mounted and through which said shaft may reciprocate. This shaft is provided with a saw mounting 41 which has an offset lower end 42 and a guide-way 43 at its upper end. The guide-way 43 is circular and is adapted to receive a supporting rod 44. The mounting 41 and the lower end of the guide shaft 40 form an opening having straight sides which encompass the back rail 45 of the saw frame. Due to this mounting the rod 44 and the rail 45 may be horizontally reciprocated. A bolt 46 connects the mounting to the guide shaft 40 and permits it to oscillate with the rod 44 and thereby prevents the saw from being rigidly held. The saw frame is completed by end members 47 and 48 which extend downwardly and to which the opposite ends of the bar 44 and the rail 45 are secured. Mounted at the lower ends of these frame members is a saw-blade 49 by which the heel is cut. This blade is of the type commonly used in hack-saws and will sever the metal nails as well as the leather parts. A suitable handle 50 is mounted at one end of the frame and permits manipulation of the saw.

In order to permit the saw to be readily caught and held out of the way, when not in use, a spring-finger 51 is fastened at the upper end of the saw mounting and is adapted to be raised until it catches within a supporting groove 52 formed around the bearing 39. The top of this bearing is formed with a circular flange 53, above which an extension of the bearing occurs. This extension is formed with a circular groove 54 adapted to be engaged by a lock-block 55 which is mounted upon a swinging arm 56 splined to the supporting shaft 40. A set-screw 57 extends through this lock-block and arm to lock the arm and shaft in position so that the saw may be guided along a given course of travel which may be at an angle to the clamping jaws.

In operation, a shoe is turned with the heel portion upwardly and placed between the jaws 15 and 16. In this position the heel will over-hang a supporting block 58 which is mounted on the slide-plate 21 and extends toward the other slide-plate 20 and directly in the rear of the supporting jaws. This block is preferably of wood so that the saw will be protected. After the heel has been positioned, as indicated by dotted lines in Fig. 1, these jaws may be drawn together by rotation of the screw 32. This will move the jaw 16 and the slide-plate 21 toward the jaw 15 and the slide-plate 20 and cause the edges —a— and —b— of the rubber facing of the jaws to engage points along the heel and the upper of the shoe. After the shoe has been thus clamped it may be adjusted in relation to the saw by actuation of the screw 26 which will advance or retract the jaws, as desired. When the depth of the cut has thus been determined, the clamping screw 36 is forced against the face of the heel and it is embedded therein. The angle to which the saw is to cut may then be determined by rotation of the shaft 40 by means of the lever arm 56. When this angle has been determined the set-screw 57 may be forced downwardly to grip the circular flange 53 of the bearing 39, thus locking the shaft in position. The saw may be vertically moved, as desired, but will not swing horizontally after this locking operation has taken place. The heel may then be cut by reciprocation of the saw along the supporting member 41, as will be understood, after which the preceding operations may be reversed to release the shoe and set the various members in other relations to each other.

It will thus be seen that the device here disclosed affords easily adjusted and positively acting means for holding a shoe and for permitting the heel thereof to be cut away at any desired depth or angle, without danger of damaging the shoe or the body portion of the heel.

While I have shown the preferred construction of my heel cutting apparatus as now known to me, it will be understood that various changes in the combination, construction and arrangement of parts may be made by those skilled in the art without departing from the spirit of my invention.

I claim:

1. A heel cutting apparatus, comprising a pair of clamping jaws adapted to grip a shoe, a saw by which the heel of said shoe is severed, means whereby the clamping jaws may be horizontally adjusted in relation to the blade of the saw, means for guiding the saw as it produces a cut through the heel of the shoe, and a clamping pin adapted to bear against the end of the heel to insure that the leather will be entirely severed by the saw.

2. A heel cutting apparatus, comprising a pair of clamping jaws adapted to grip a shoe, a saw by which the heel of said shoe is severed, means whereby the clamping jaws may be horizontally adjusted in relation to the blade of the saw, means for guiding the saw as it produces a cut through the heel of the shoe, a clamping pin adapted to bear against the end of the heel to insure that the leather will be entirely severed by the saw, and adjustable means for determining the angle at which the saw produces its cut to the heel.

3. A heel cutting apparatus, comprising a base, a pair of clamping jaws mounted thereon, said jaws being adapted to bear against the heel and the upper of the shoe along opposite sides thereof, means for adjustably setting the jaws in relation to each other, means for horizontally adjusting the jaws in relation to the base, a vertically slidable saw support mounted above the base, a saw slidably secured to said support and adapted to be used in severing the heel of the shoe, means for adjustably determining the path of travel along which the saw will cut, and a catch by which the saw may be temporarily supported above the jaws and out of contact with the shoe secured therebetween.

4. In a heel cutting apparatus, a base adapted to be mounted upon a table, a pair of supporting arms extending forwardly from the base and providing a long rectangular open-ended slot, means upon the supporting arms forming guide-ways, a slide plate upon one of the guide-ways, a second slide-plate upon the other guide-way, an adjustable connection between the slide plates for moving the second slide-plate to and from the first slide-plate, an adjustable connection between the base and the first slide-plate for moving the slide-plates backwardly and forwardly, mating clamping jaws fixed upon the slide plates, and a hand-saw mounted to reciprocate and oscillate crosswise of the slide-plates behind the jaws.

5. In a heel cutting apparatus, a base adapted to be mounted upon a table, a pair of supporting arms extending forwardly from the base and forming guide-ways, a slide plate mounted upon one of the guide ways, a second slide-plate mounted upon the other guide-way, a connecting bar extending from the first slide-plate, a guide block upon the second slide-plate through which said connecting bar extends, an adjusting screw connecting the two slide plates for moving the slide-plates to and from each other, an adjusting screw connecting the slide-plates to the base for moving the slide plates backwardly and forwardly, jaws mounted upon the slide-plates for engaging the heel of a shoe, and a clamping screw mounted in position to engage the lower face of a shoe heel when the heel is between the jaws.

6. In a heel cutting apparatus, a heel clamping jaw comprising a rigid standard, a jaw pivotally connected to the standard, said jaw being arcuate in cross-section and arcuate longitudinally so as to conform to the curved side face of a shoe heel, a rubber facing for the jaw, and means for holding the rubber facing in place upon the jaw.

In testimony whereof I have signed my name to this specification.

FRANCIS J. RIBBLE.

Copies of this patent may be obtained for five cents each, by addressing the "Commissioner of Patents, Washington, D. C."